United States Patent [19]

Seidensticker et al.

[11] Patent Number: 5,801,664
[45] Date of Patent: Sep. 1, 1998

[54] SYSTEM AND METHOD FOR TRANSMITTING DATA FROM A COMPUTER TO A PORTABLE INFORMATION DEVICE USING RF EMISSIONS FROM A COMPUTER MONITOR

[75] Inventors: Robert B. Seidensticker, Woodinville; William E. Kim, Seattle, both of Wash.

[73] Assignee: Microsoft Corporation, Redmond, Wash.

[21] Appl. No.: 600,410

[22] Filed: Feb. 12, 1996

[51] Int. Cl.$^6$ .................................................. G09G 5/00
[52] U.S. Cl. ................................ 345/2; 345/10; 345/204
[58] Field of Search ............................ 345/1, 2, 173, 345/179, 180, 204, 10, 11; 364/708.1; 395/200

[56] References Cited

U.S. PATENT DOCUMENTS

| 5,007,085 | 4/1991 | Greanias et al. | 345/180 |
| 5,251,301 | 10/1993 | Cook | 395/200 |
| 5,307,297 | 4/1994 | Iguchi et al. | 364/708.1 |
| 5,349,139 | 9/1994 | Verrier et al. | 345/179 |
| 5,488,571 | 1/1996 | Jacobs et al. | 364/708.1 |
| 5,526,023 | 6/1996 | Sugimoto et al. | 345/173 |
| 5,535,147 | 7/1996 | Jacobs et al. | 364/708.1 |
| 5,594,462 | 1/1997 | Fishman et al. | 345/2 |
| 5,652,602 | 7/1997 | Fishman et al. | 345/2 |

*Primary Examiner*—Richard A. Hjerpe
*Assistant Examiner*—Kent Chang
*Attorney, Agent, or Firm*—Lee & Hayes, PLLC

[57] ABSTRACT

A data transmission system includes a programmable portable information device, a frame-scanning graphics display device (e.g., a CRT monitor), and a display device controller (e.g., a personal computer). The display device controller supplies pixel data to the frame-scanning graphics display device which causes the display device to depict a particular changing optical pattern. To display the particular pattern, the frame-scanning graphics display device inherently fluctuates in energy output as different pixel intensities require different degrees of power. As a result, the frame-scanning graphics display device effectively emits an RF carrier signal. The programmable portable information device is equipped with an RF receiver that can receive the RF signal from the display device when the programmable portable information device is within a transmission range. The RF carrier signal is modulated to carry programming data to the portable information device. The portable information device demodulates the RF signal to obtain the digital data stream.

30 Claims, 7 Drawing Sheets

SYSTEM AND METHOD FOR TRANSMITTING DATA FROM A COMPUTER TO A PORTABLE INFORMATION DEVICE USING RF EMISSIONS FROM A COMPUTER MONITOR

TECHNICAL FIELD

This invention relates to systems and methods for transmitting serial data from computers to programmable portable information devices.

BACKGROUND OF THE INVENTION

In recent years, there has been an increasing use of compact, pocket-size electronic personal organizers that store personal scheduling information such as appointments, tasks, phone numbers, flight schedules, alarms, birthdays, and anniversaries. Some of the more common electronic organizers are akin to hand-held calculators. They have a full input keyboard with both numeric keys and alphabet keys, as well as special function keys. The organizers also have a liquid crystal display (LCD) which often displays full sentences and rudimentary graphics.

Pocket-size personal organizers prove most useful to busy individuals who are frequently traveling or always on the move from one meeting to the next appointment. Unfortunately, due to their hectic schedules, these individuals are the people most likely to forget their personal organizers during the frantic rush to gather documents, files, laptops, cellular phones, and travel tickets before heading off to the airport or train depot. It would be desirable to reduce the number of electronic devices that these individuals need to remember for each outing.

Electronic watches have evolved to the point that they can function as personal organizers. Like the pocket-size devices described above, such watches can be programmed with certain key appointments, tasks, phone numbers, flight schedules, alarms, birthdays, and anniversaries. Since watches are part of everyday fashion attire, they are more convenient to carry and less likely to be forgotten by busy people. However, it is much more difficult to enter data into a watch than it is to enter the same data into a pocket-size personal organizer. This difficulty is due in large part to the limited number of input buttons and display characters available on reasonably-sized watches. Most watches are limited to having only three or four input buttons. A wearer programs a watch by depressing one or more buttons several times to cycle through various menu options. Once an option is selected, the user depresses another button or buttons to input the desired information. These input techniques are inconvenient and difficult to remember. Such techniques are particularly inconvenient when a wearer wishes to enter an entire month's schedule. Although watches have been made with larger numbers of input keys, such watches are usually much too large for comfort, and tend to be particularly unattractive.

Apart from personal organizers, it is common for many people to maintain appointment calendars and task lists on their personal computers. One example time management software is Microsoft's® Schedule+™ for Windows® which maintains daily appointment schedules, to-do lists, personal notes, contact lists, and calendar planning. This information is often a duplicate of that maintained on the portable personal organizer.

Timex Corporation of Middlebury, Conn., has introduced the Timex® Data Link watch. This watch utilizes new technology for transferring information from a personal computer to a watch. The face of the watch has an optical sensor which is connected to a digital serial receiver, better known as a UART (universal asynchronous receiver/transmitter). The watch expects to receive a serial bit transmission in the form of light pulses at a fixed bit rate. A pulse represents a binary '0' bit, and the absence of a pulse represents a binary '1' bit.

In the Data Link system, the CRT (cathode ray tube) or other scanned-pixel display of a personal computer is used to provide light pulses to the watch. Although it appears to a human viewer that the pixels of a CRT are illuminated simultaneously, the pixels are actually illuminated individually, one at a time, by an electron beam which sequentially scans each row of pixels beginning with the top row and ending with the bottom row. It is this characteristic of a CRT and of other scanned display devices which is utilized to transmit serial data to the Data Link watch. To transfer data, the watch is held near and facing the CRT. The computer is programmed to display a sequence of display frames in which spaced horizontal pixel lines represent individual bits of data to be transferred. Lines are illuminated or not illuminated, depending on whether they represent binary '0' bits or binary '1' bits. Each line appears as a continuous pulse of a finite duration to the receiving watch. The watch recognizes an illuminated line as a binary '0' bit. It recognizes a non-illuminated line as a binary '1' bit. Generally, ten bits are transmitted in a single CRT display frame: eight data bits, a start bit, and a stop bit. As used herein, the term "display frame" means a single screen-size image made up of a matrix of pixels. A display frame is generally created by sequentially illuminating or refreshing the pixels of the display device.

While the CRT-based method has proven effective, it employs rather complicated transmission and timing schemes to ensure that the lines displayed on the CRT are interpreted as pulses by the watch's UART. Additionally, the optical transmission scheme requires the user to hold the watch very still and orient it a certain way to face the optical sensor toward the CRT. Movement or misalignment of the watch might result in a loss of data transmission, requiring retransmission of all or part of the data stream.

It is therefore an object of this invention to provide a system and method for transmitting data to a portable information device (such as a watch) that does not employ the optical transmission scheme.

SUMMARY OF THE INVENTION

This invention provides a system and method for transmitting data to a portable information device, such as a programmable watch, by way of an RF signal controllably emitted during operation of a CRT monitor or other framescanning graphics display device.

According to one aspect of this invention, a data transmission system includes a programmable portable information device, a frame-scanning graphics display device (e.g., a CRT monitor), and a display device controller (e.g., a personal computer). The display device controller supplies pixel data to the framescanning graphics display device which causes the display device to depict a particular changing optical pattern. To display the particular pattern, the framescanning graphics display device fluctuates in energy output as different pixel intensities require different degrees of power. As a result, the frame-scanning graphics display device effectively emits an RF signal. The programmable portable information device is equipped with an RF receiver that can receive the RF signal from the display device when the programmable portable information device is within a transmission range. The RF signal is modulated to carry programming data to the portable information device. The portable information device demodulates the RF signal to obtain the digital data stream.

According to another aspect of this invention, a method for transmitting data from a computer monitor to a portable information device is described. This method includes moving the portable information device within a transmission range of the computer monitor (e.g., 2–3 feet or less), displaying a pattern on the computer monitor that causes the computer monitor to emit an RF signal that is modulated with data, detecting the RF signal at the portable information device, and demodulating the RF signal at the portable information device to recover the data.

BRIEF DESCRIPTION OF THE DRAWINGS

The same reference numerals are used throughout the disclosure to reference like components and features.

DETAILED DESCRIPTION OF THE PREFERRED EMBODIMENT

Figure 1:
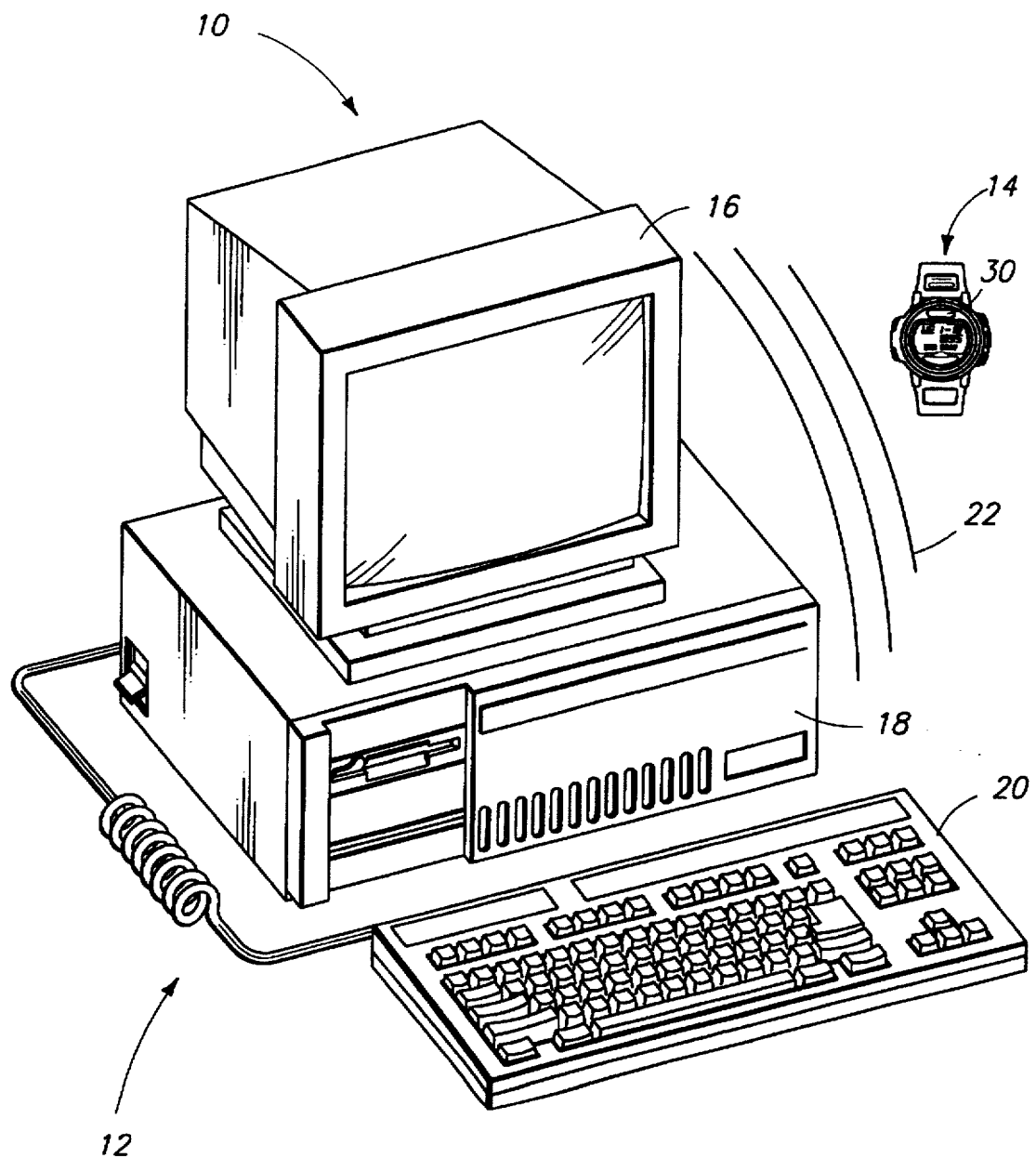
FIG. 1 is a diagrammatic illustration of a system for transmitting data to a programmable watch from a computer monitor according to one implementation of this invention.

FIG. 1 shows a data transmission system 10 according to an aspect of this invention. System 10 includes a computer system 12 and a portable information device in the form of programmable watch 14. Computer system 12 includes a visual display device 16, a central processing unit (CPU) 18, and a keyboard 20 (or other input device). The illustrated computer system is an IBM(®-compatible system, although other architectures, such as Apple®-compatible systems, can be employed. Visual display device 16 is a frame-scanning graphics display device that emits RF energy. In the illustrated implementation, the visual display device 16 is a CRT (Cathode Ray Tube) monitor that is commonly used in personal computers.

Computer system 12 remotely programs watch 14 by encoding digital data on an RF signal 22 which is emitted from the CRT monitor 16 during depiction of an optical pattern. Watch 14 is equipped with an RF antenna 30 that can detect the RF signal 22 when the watch is within a transmission range. The digital data carried by the RF signal 22 is used to program the watch or update information. The programmable watch can be configured to function as a portable personal time manager.

Figure 2:
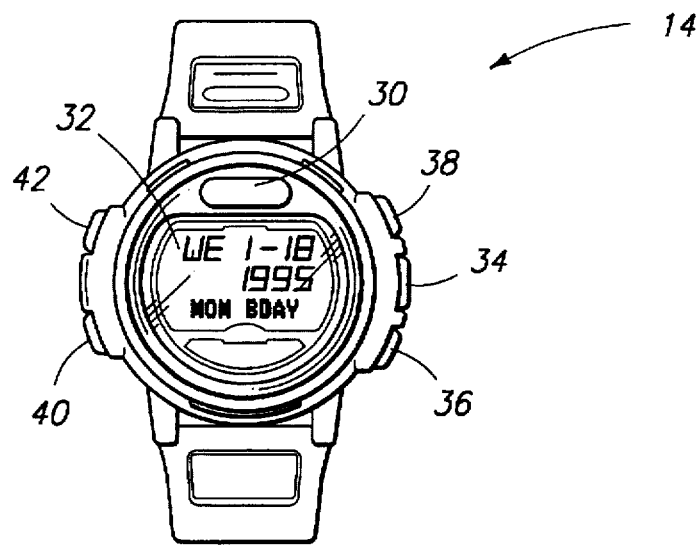
FIG. 2 is a diagrammatic front view of the programmable watch which is used in the FIG. 1 system.
Figure 3:
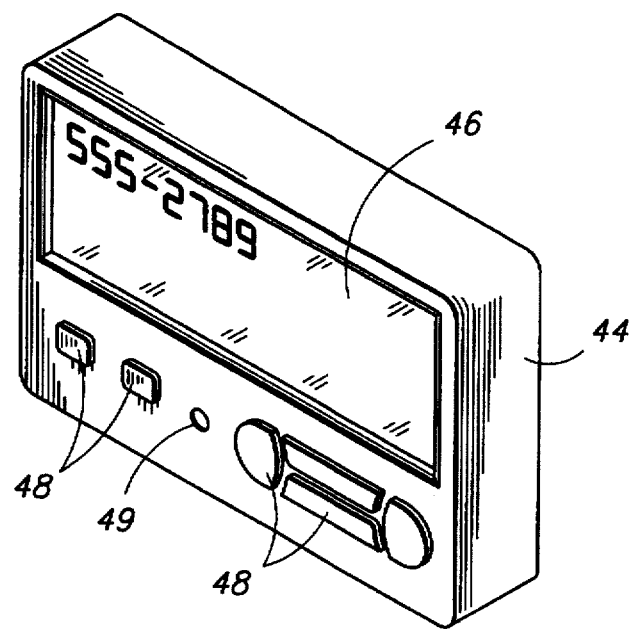
FIG. 3 is a diagrammatic front view of a programmable portable information device embodied as a personal digital assistant which can alternatively be used in the FIG. 1 data transmission system.

FIG. 2 shows an external face of programmable watch 14. It includes a small display 32 (such as an LCD), a mode select button 34, a set/delete button 36, next/previous programming buttons 38 and 40, and a display light button 42. In the programming mode, display 32 indicates the programming option, and what data is being entered. During the normal operational mode, display 32 shows time of day, day of week, or any other function common to watches. Although diagrammatically shown on the exterior of the watch, antenna 30 is mounted internally and is sufficient in length to detect the wavelength of the RF signal emitted from the CRT monitor 16.

Figure 6:
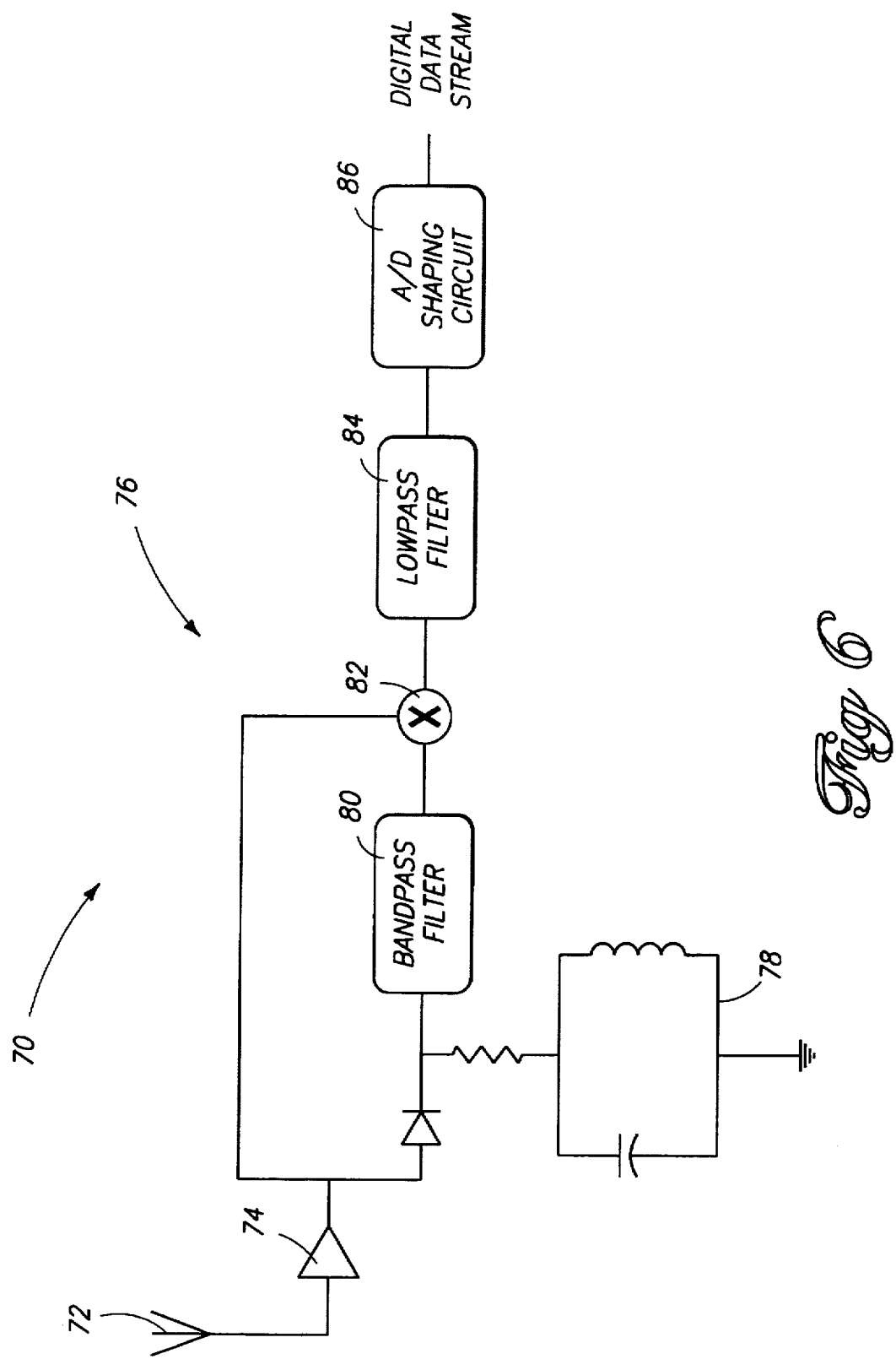
FIG. 6 is a schematic of an RF receiver located in the programmable watch according to one aspect of this invention.

For discussion purposes, the data transmission system will be described in the context of the programmable watch. However, other forms of portable information devices can be used, such as pagers and personal digital assistants (PDAs). FIG. 6 shows an alternative embodiment of a portable information device 44 in the form of a PDA. Portable information device 44 has an LCD 46, a keypad 48 for entering data, and an antenna 49. Like watch 14, device 44 can be programmed from a remote computer using RF emissions from the monitor to carry data to the device. As used herein, "portable information device" means any small, portable, electronic apparatus.

Figure 4:
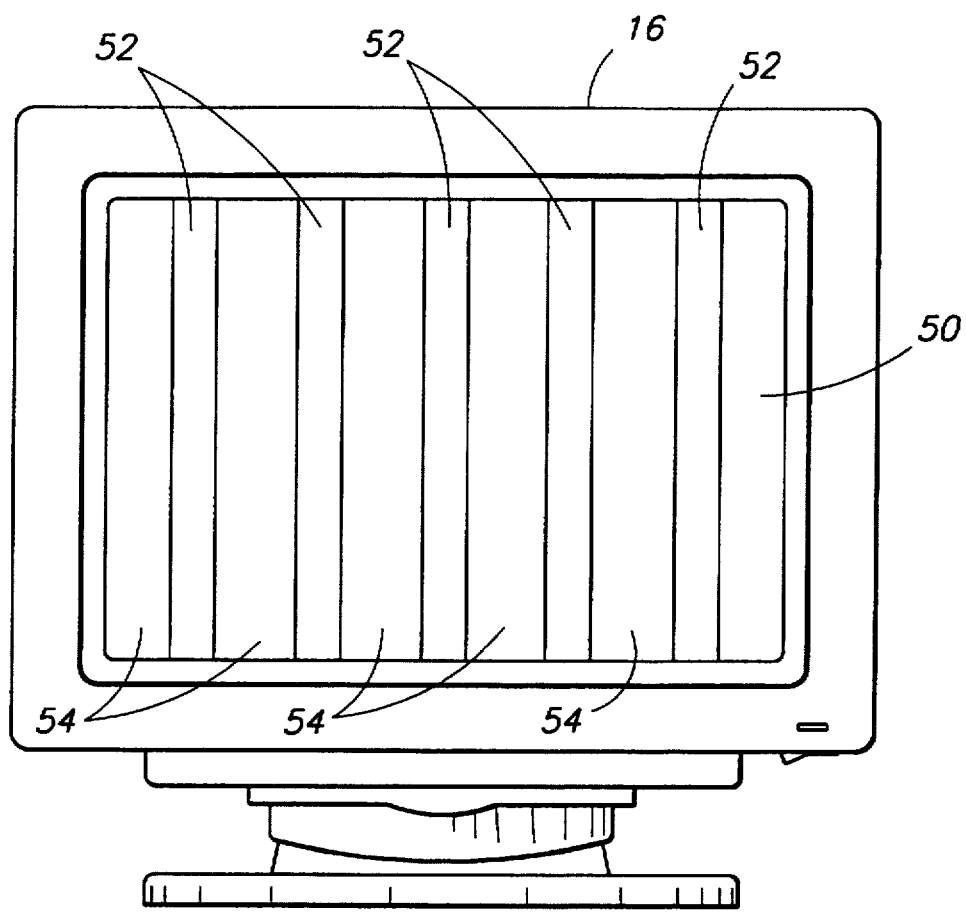
FIG. 4 is a functional schematic of a computer monitor used in the FIG. 1 system.

FIG. 4 shows the visual display device 16 in more detail. Display device 16 is a frame-scanning graphics display device, such as a CRT (Cathode Ray Tube), that is controlled by the computer CPU to depict a changing optical pattern on a monitor screen 50. The monitor screen 50 is made up of individual picture elements, or "pixels," arranged in a pattern, which is customarily a matrix of rows and columns. Conventional color VGA monitors typically have a resolution of 640 columns by 480 rows of pixels, or better. Tiny spots of phosphors are positioned at each pixel. In a CRT, the pixels are illuminated individually by an electron beam (i.e., the cathode ray) which sequentially scans each row of pixels beginning with the top row and ending with the bottom row. The beam is deflected horizontally (in the line direction) and vertically (in the field direction) to scan an area of the screen to produce a single display frame. The electron beam strikes the phosphors, causing them to glow. The phosphors continue to glow for a short time interval that is sufficient to provide a light pulse.

One type of conventional CRT monitor operates at 60 Hz, meaning that the monitor screen 50 is refreshed once every 1/60th or 0.01667 second. In other words, 1/60th of a second is required for the electron beam to scan the entire matrix of pixels from top to bottom and return to the top for the next frame. This frequency is known as the "vertical refresh frequency" of the monitor, and it typically ranges from 60 Hz to 72 Hz depending upon the monitor type. At these frequencies, the image on the screen appears without flickering as the human eye only begins to perceive a non-continuous flicker at a much slower frequency of about 10–50 Hz.

The electron beam scans each row and returns to the beginning of the next row at a rate of approximately 15–20 kHz. This frequency is known as the "line is scan rate." Additionally, the electron beam scans each individual pixel at a rate of around 20 MHz. This frequency is referred to as the "dot clock rate."

Suppose the CRT monitor is driven to scan every pixel on the screen. When analyzing a frequency response spectrum of this optical pattern, there are very pronounced impulses at the vertical refresh frequency (60–72 Hz), the line scan rate (15–20 kHz), and the dot clock rate (≈20 MHz). These frequency impulses are caused by energy fluctuation of the CRT monitor during its inherent operation of scanning a single frame.

RF signals produced by CRT monitors are sufficiently strong to be picked up by external and remote equipment. As one example, there is equipment currently available that enables clandestine reproduction of contents on one monitor onto a second monitor. The government has a program referred to as "Tempest" that defines how to configure monitors and computers to defend against such eavesdropping equipment.

The data transmission system exploits the natural RF emission phenomenon of such graphics display devices by controlling them to generate an RF signal of a selected carrier frequency and encoding digital programming data onto the RF signal. In the described implementation, software executing in the CPU 18 causes the CRT monitor 16 to output a particular changing optical pattern which results in an energy fluctuation of the CRT monitor, thereby causing emission of an RF signal. One approach is for the CPU to supply certain pixel data that induces the desired optical pattern.

Two examples of using pixel data to create an optical pattern that in turn effectuates generation of an RF carrier signal are described with reference to FIG. 4. The first example pattern, which is a less preferred approach, is a series of horizontal dashes and spaces. The CPU 18 sends pixel data to the CRT monitor 16 which alternately turns on or turns off pixels at specific intervals while scanning each line. For instance, suppose the pixel data instructs the CRT monitor 16 to turn on pixels within five zones 52 (as represented by the vertical boundary lines in FIG. 4) and to turn off pixels in the intervals 54 between the pixel-on zones. To produce this optical pattern, the CRT monitor periodically fires the electron beam for a series of pixels, then leaves the beam off for a series of pixels, which generates energy fluctuations at a given frequency. The energy fluctuations in turn provide an RF carrier signal. Assuming the line scan rate is approximately 20 kHz, the five dash pattern might induce an RF signal at approximately 100 kHz. The drawback of this approach is that the sudden changes at the boundaries between the dashes and spaces are abrupt. The resultant RF carrier waveform approximates a square wave due to the on or off states of the pixels, which has a tendency to be noisy.

The second example pattern, which is the more preferred approach, is a continuous line having pixels illuminated with different intensities. The CPU 18 sends pixel data to the CRT monitor 16 which draws a continuous line, but adjusts the intensities of the pixels at selected intervals within that line. With reference to FIG. 4, suppose the zones 52 represent "bright zones" in which the pixel intensity is high and zones 54 represent "dull zones" in which the pixel intensity is low. Between these bright and dull zones, the pixel intensity is smoothly and continuously changed. To produce this optical pattern, the CRT monitor 16 continuously fires the electron beam, but with changing energy to produce the brighter and duller pixels. This produces smooth transitioning energy fluctuations that provide the RF carrier signal. As before, assuming the line scan rate is approximately 20 kHz, the pattern of five bright zones interposed by five dull zones induces an RF signal at approximately 100 kHz. The advantage of this approach is that the pixel intensity changes in a smooth and continuous manner between the bright and dull zones. As a result, the RF carrier waveform approximates a sinusoidal wave, which is less noisy in comparison to the square wave described above and creates a more suitable carrier.

The horizontal blank interval causes a disruption in the RF signal. The horizontal blank is the time interval used to return the electron beam from the end of one horizontal line at the right hand side of the monitor to the beginning of the next horizontal line at the left hand side of the monitor. This disruption is minimized, however, by having the next line pick up where it would have been if the carrier signal had continued during the horizontal blank interval. The next horizontal line is slightly phase shifted to maintain the carrier phase used in the previous horizontal line. This phase shifting technique causes less disruption in comparison to a technique of starting each horizontal line at the same place in the sinusoidal cycle.

Figure 5:
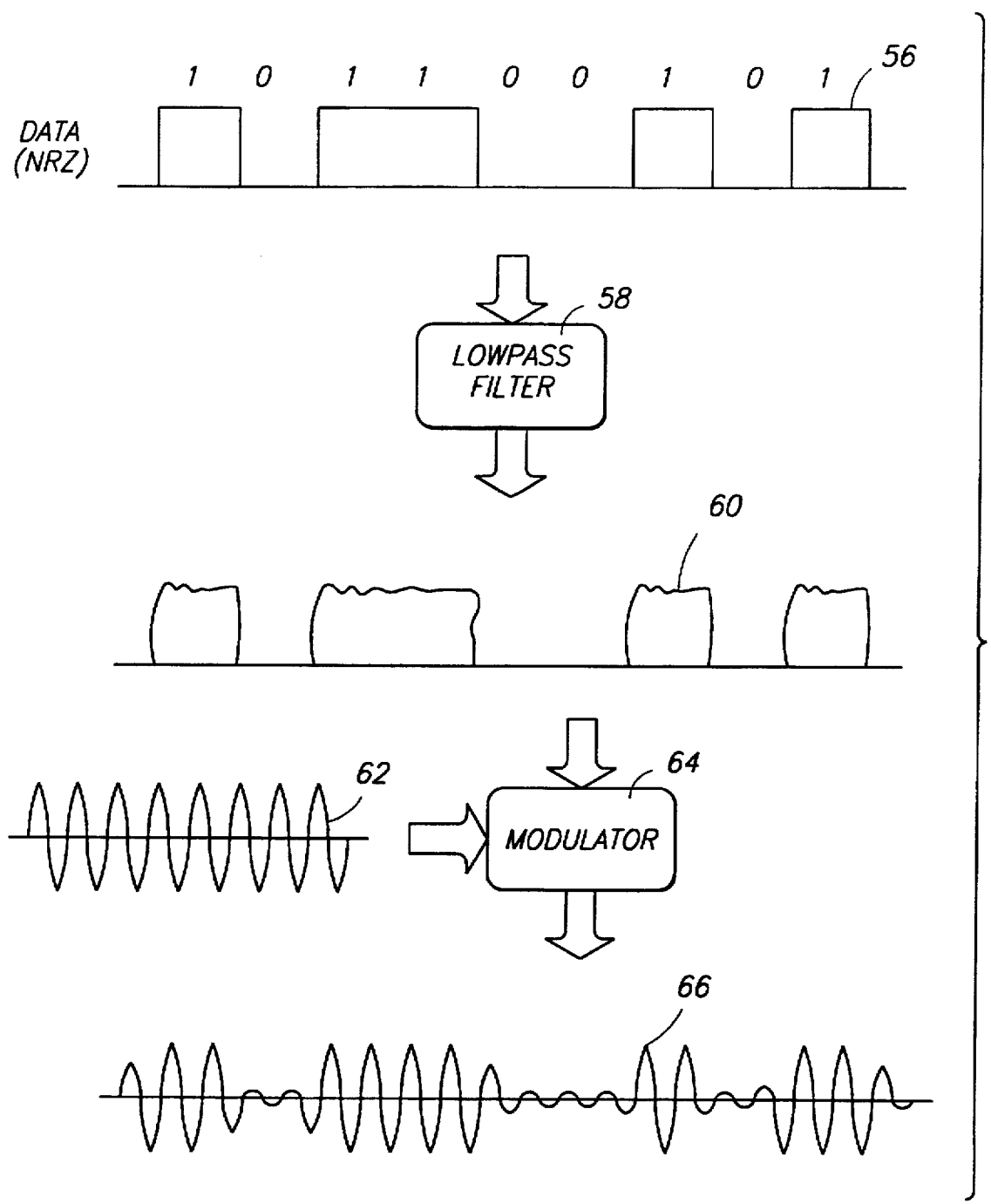
FIG. 5 is a diagrammatic illustration of encoding programming data onto an RF carrier signal emitted from the computer monitor.

FIG. 5 demonstrates one possible technique for encoding the digital programming data onto the RF carrier signal. A digital data stream 56 comprises a sequence of binary "1"s and "0"s. The digital data stream 56 is coded using a non-return to zero (NRZ) scheme whereby a bit remains at the binary value until the next bit is ready. Any suitable serial protocol can be used to configure the data stream. For instance, the bit stream might include a start code (e.g., an alternating series of "1"s and "0"s) followed by a sequence of data bits framed between start and stop bits.

The digital data stream 56 is passed through a low pass filter 58 which effectively softens the abrupt transition edges of data to produce a modified data stream 60. There is slight ringing near the transition edges of the modified data stream 60, a result known as Gibbs Phenomenon.

A near-sinusoidal RF carrier signal 62 is produced by a pixel pattern of continuous changing pixel intensities. The RF carrier signal 62 is modulated using the modified data stream 60 at modulator 64 according to amplitude modulation (AM). This modulation yields an AM signal 66 wherein the RF carrier signal has amplitude changes in a manner which carries the intelligent information representing the digital data. It should be noted that other techniques for encoding the data might alternately be used, such as frequency modulation (FM).

The modulator 64 is the CRT monitor which receives both pixel data representing the digital programming data and pixel data representing the carrier signal. The CRT monitor combines the two types of pixel data to form a changing optical pattern that induces energy fluctuations having a time domain response as shown by AM signal 66.

With reference again to FIG. 1, the AM signal 66 is transmitted to the programmable watch 14. The AM signal 66 is considerably weak in comparison to well known commercial AM broadcasts, and may only have an effective range of a few feet. Accordingly, the watch 14 is held within a transmission range of 2–3 feet to receive the AM signal.

FIG. 6 shows an RF receiver 70 that is mounted in the watch. The RF receiver 70 includes an antenna 72 to receive the RF signal and an amplifier 74 to boost the signal to a desired signal strength. The RF receiver 70 also includes a demodulator 76 to demodulate the RF signal to extract the digital data stream. The demodulator 76 is configured in the form of a gated demodulator which includes an oscillator 78, a bandpass filter 80, a gate 82, a lowpass filter 84, and an A/D shaping circuit 86. The oscillator 78 generates a sinusoidal waveform at the same frequency of the carrier signal received at the antenna 72. Bandpass filter 80 is a narrow filter centered on the carrier frequency. The output of the bandpass filter 80 is gated with the original RF signal to recover the encoded data content. In the frequency response spectrum, the output of gate 82 has an impulse at the carrier frequency and symmetric sidebands about the impulse which carrier the data. The gated output is passed through the low pass filter 84 to eliminate high frequency harmonics and then through A/D shaping circuit 86 to reproduce the digital data stream.

Figure 7:
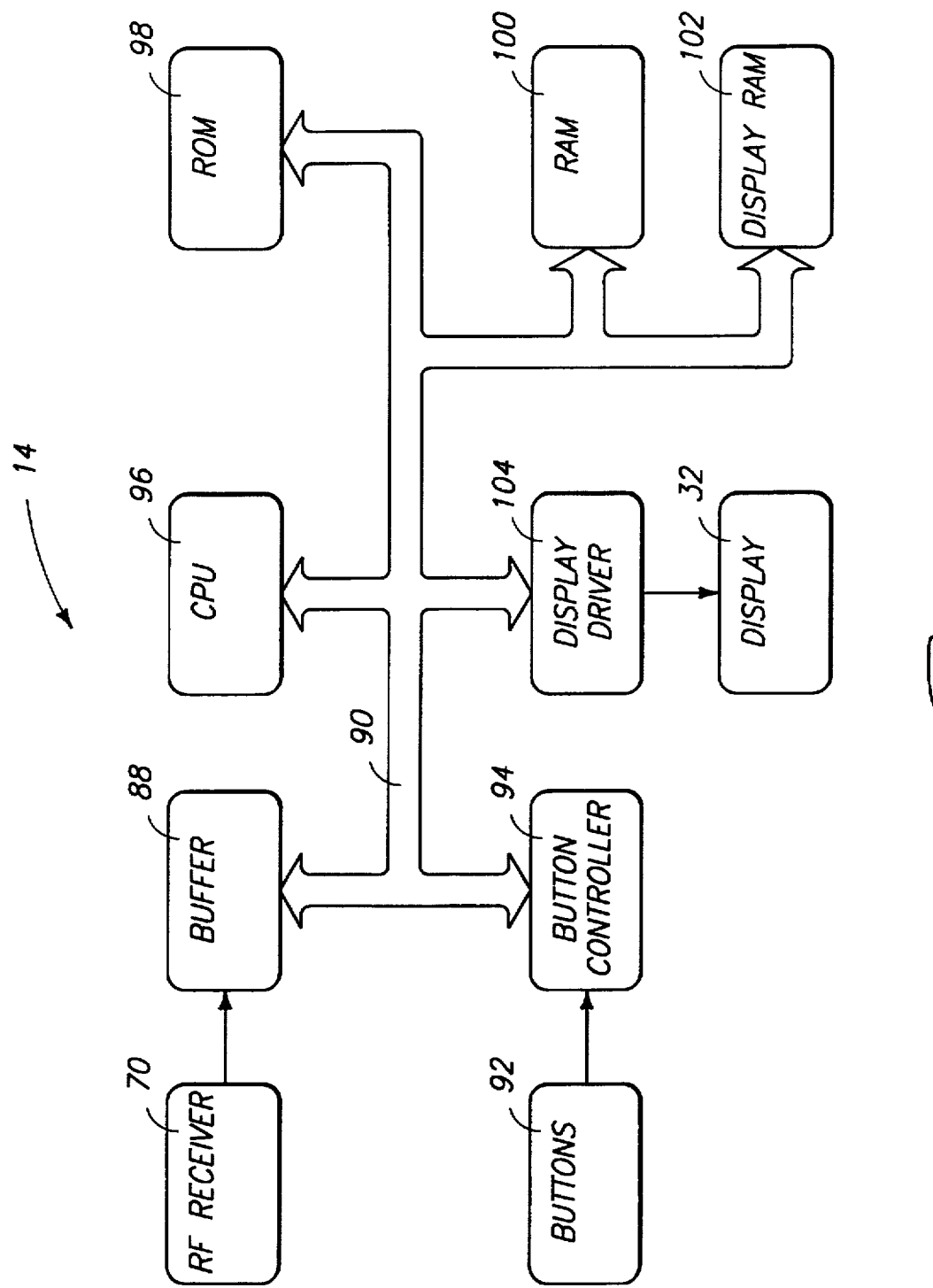
FIG. 7 is a block diagram of the programmable watch.

FIG. 7 shows a functional block diagram of the watch 14. The RF receiver 70 outputs the digital data into a buffer 88, which is coupled to an internal bus 90 (e.g., an eight-bit bus). Inputs received from the control buttons on the watch, referenced generally by box 92, are detected and deciphered by button controller 94 and placed on bus 90. The watch 14 also includes a CPU (Central Processing Unit) 96 for performing the data processing tasks, ROM (Read Only Memory) 98 for storing initial power-up programs and other instructions, and RAM (Random Access Memory) 100 for data storage. A display RAM 102 is provided to temporarily store data used by display driver 104 to depict visual information on display 32. These components, including at least the demodulator portion of the RF receiver 70, can be incorporated into a single microprocessor-based integrated circuit. One appropriate microprocessor IC is available from Motorola Corporation as model MC68HC05HG modified with an RF demodulator.

Figure 8:
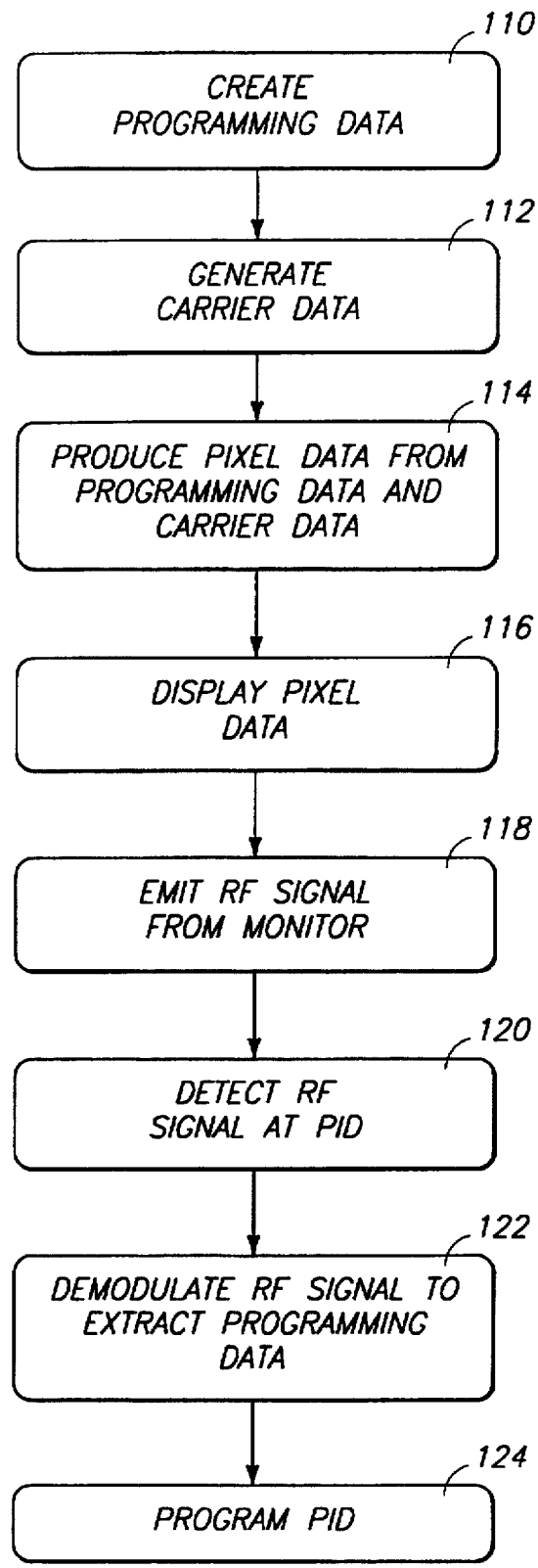
FIG. 8 is a flow diagram of a method for transmitting data from a computer monitor to a portable information device.

FIG. 8 shows a preferred method for transmitting data from the computer monitor to the programmable watch according to another aspect of this invention. To program the watch, the computer is first loaded with a compatible time management software and pattern generating software. One example time management software is Microsoft's® Schedule+™ for Windows®. The user selects a desired option from a menu of choices displayed on the monitor in a human-intelligible form. For instance, suppose the user wants to enter his/her appointments and tasks for the month of January, including a reminder for his/her mother's birthday. The user inputs the scheduling information on the computer using a keyboard or other input device. This scheduling information is converted to appropriate programming data to be downloaded to the watch (step 110 in FIG. 8).

A carrier frequency for the RF signal is predetermined. In the above example, a carrier frequency of 100 KHz is used. In the absence of any encoded programming data, the pixel data which is sufficient to cause the CRT monitor to emit a near-sinusoidal RF carrier signal at the carrier frequency is generated at step 112. This carrier data might be precomputed and stored in the CPU 18. At step 114 in FIG. 8, the pattern generating software executing in the CPU 18 produces an appropriate set of pixel data using the programming data and the carrier data. This pixel data is sent to the CRT monitor 16, and causes the monitor to display an optical pattern (step 116). While depicting the particular optical pattern, the CRT monitor 16 emits an RF signal representing the digital data stream. For instance, an RF carrier signal at the carrier frequency is amplitude modulated using the digital data stream to produce an AM signal. In this manner, the programming data, including the monthly tasks and birthday reminder, is transmitted from the CRT monitor 16 to the watch 14.

At step 120, the RF receiver 70 (FIG. 6) of watch 14 detects the RF signal emitted from the monitor so long as the watch is within the effective transmission range. The RF signal is demodulated at the watch to extract the digital programming data (step 122). The data is used to program or update information at the watch with the monthly tasks and birthday reminder.

The data transmission system is advantageous in that it provides a convenient way to download data from a computer to a portable information device. Because RF communication is employed, the user need not hold the portable information device in any particular orientation, but simply within a transmission proximity to the monitor.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

We claim:

1. A data transmission system, comprising:

a programmable portable information device having an RF receiver;

a frame-scanning graphics display device to display a sequence of changing optical patterns;

a display device controller connected to cause the frame-scanning graphics display device to depict a particular changing optical pattern that produces energy fluctuation in the frame-scanning graphics display device, the energy fluctuation defining an RF signal representing a digital data stream that can be detected by the RF receiver when the programmable portable information device is within a transmission range; and the portable information device receiving the RF signal to obtain the digital data stream.

2. A data transmission system as recited in claim 1 wherein the framescanning graphics display device comprises a CRT monitor.

3. A data transmission system as recited in claim 1 wherein the display device controller comprises a personal computer.

4. A data transmission system as recited in claim 1 wherein the portable information device comprises a programmable watch.

5. A data transmission system as recited in claim 1 wherein the transmission range is approximately 2–3 feet or less.

6. A data transmission system as recited in claim 1 wherein the digital data stream comprises programming data to program the portable information device.

7. A data transmission system as recited in claim 1 wherein the display device controller supplies pixel data to the frame-scanning graphics display device to define the particular changing optical pattern.

8. A data transmission system as recited in claim 1 wherein the display device controller causes the frame-scanning graphics display device to vary pixel intensities during depiction of the changing optical pattern to produce the energy fluctuation in the frame-scanning graphics display device.

9. A data transmission system as recited in claim 1 wherein the display device controller causes the frame-scanning graphics display device to alternately turn on or turn off pixels during depiction of the changing optical pattern to produce the energy fluctuation in the frame-scanning graphics display device.

10. A data transmission system as recited in claim 1 wherein the display device controller causes the frame-scanning graphics display device to emit an RF carrier signal at a selected frequency and to modulate the RF carrier signal using the digital data stream.

11. A data transmission system as recited in claim 10 wherein the RF carrier signal is modulated using amplitude modulation.

12. A data transmission system as recited in claim 10 wherein the selected frequency is a multiple of a line scan rate of the frame-scanning graphics display device.

13. A data transmission system as recited in claim 10 wherein the portable information device has a demodulator coupled to the RF receiver to demodulate the RF carrier signal and extract the digital data stream.

14. A data transmission system, comprising:

a programmable portable information device having an RF receiver;

a frame-scanning graphics display device to display a sequence of changing optical patterns;

a display device controller connected to supply pixel data to the frame-scanning graphics display device to define the particular changing optical pattern, the pixel data causing the frame-scanning graphics display device to vary pixel intensities during depiction of the particular changing optical pattern to produce energy fluctuation in the frame-scanning graphics display device which emits an RF carrier signal at a selected frequency and modulated according to a digital data stream; and the portable information device receiving the modulated RF carrier signal when the programmable portable information device is within a transmission range, the portable information device further having a demodulator to demodulate the RF carrier signal to obtain the digital data stream.

15. A data transmission system as recited in claim 14 wherein the frame-scanning graphics display device comprises a CRT monitor.

16. A data transmission system as recited in claim 14 wherein the RF carrier signal is amplitude modulated.

17. A data transmission system as recited in claim 14 wherein the selected frequency is a multiple of a line scan rate of the frame-scanning graphics display device.

18. A computer system for transmitting data to a remote programmable portable information device, the computer system comprising:

a frame-scanning graphics display device to display a sequence of changing optical patterns; and a display device controller connected to cause the frame-scanning graphics display device to depict a particular changing optical pattern that produces energy fluctuation in the frame-scanning graphics display device, the energy fluctuation defining an RF signal representing a digital data stream that can be detected by the programmable portable information device when the programmable portable information device is within a transmission range.

19. A computer system as recited in claim 18 wherein:

the frame-scanning graphics display device comprises a CRT monitor; and the display device controller comprises a CPU that is programmed to supply pixel data to the frame-scanning graphics display device to define the particular changing optical pattern.

20. A computer system as recited in claim 18 wherein the display device controller causes the frame-scanning graphics display device to vary pixel intensities during depiction of the changing optical pattern to produce the energy fluctuation in the frame-scanning graphics display device.

21. A computer system as recited in claim 18 wherein the display device controller causes the frame-scanning graphics display device to alternately turn on or turn off pixels during depiction of the changing optical pattern to produce the energy fluctuation in the frame-scanning graphics display device.

22. A method for transmitting data from a computer monitor to a portable information device, the portable information device being equipped with an RF receiver, the method comprising the following steps:

displaying a pattern on the computer monitor that produces energy fluctuation in the computer monitor, the energy fluctuation defining an RF signal representing a digital data stream;

receiving the RF signal at the portable information device when the portable information device is within a transmission range; and extracting the digital data stream from the RF signal at the portable information device.

23. A method as recited in claim 22 wherein the transmission range is approximately 2–3 feet or less.

24. A method as recited in claim 22 further comprising the step of programming the portable information device using the digital data stream.

25. A method as recited in claim 22 further comprising the step of varying pixel intensities during display of the pattern on the computer monitor to produce the energy fluctuation.

26. A method as recited in claim 22 further comprising the step of alternately turning on or turning off pixels during display of the pattern on the computer monitor to produce the energy fluctuation.

27. A method as recited in claim 22 further comprising the following additional steps:

displaying a pattern on the computer monitor that causes the computer monitor to emit an RF carrier signal at a selected frequency; and modulating the RF carrier using the digital data stream.

28. A method as recited in claim 27 further comprising the step of modulating the RF carrier signal according to amplitude modulation.

29. A method as recited in claim 27 wherein the selected frequency is a multiple of a line scan rate of the computer monitor.

30. A method as recited in claim 27 further comprising the step of demodulating the RF carrier signal to extract the digital data stream.

* * * * *